J. F. POND.
Grain Drill.

No. { 2,099, 33,103. }

Patented Aug. 20, 1861.

Witnesses:

Inventor:

UNITED STATES PATENT OFFICE.

JOSEPH F. POND, OF CLEVELAND, OHIO.

IMPROVEMENT IN SEED-PLANTERS.

Specification forming part of Letters Patent No. 33,103, dated August 20, 1861.

*To all whom it may concern:*

Be it known that I, JOSEPH F. POND, of the city of Cleveland, in the county of Cuyahoga and State of Ohio, have invented new and useful Improvements in Seed-Planters and Cultivating and Hoeing Machines; and the following is a clear and exact description of the same, reference being had to the accompanying drawings, making a part of this specification.

Figure 1:
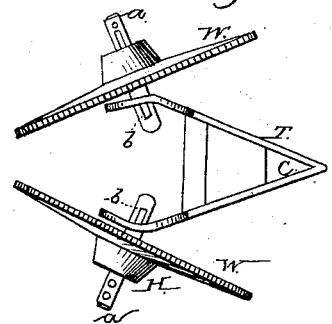
Figure 2:
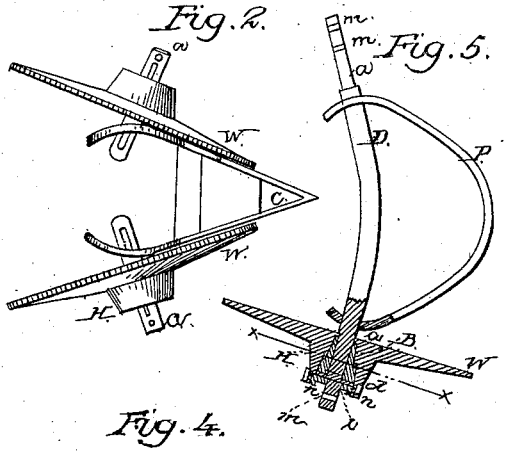
Figure 5:
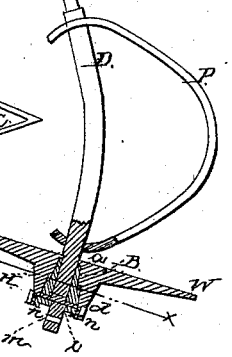
Figure 3:
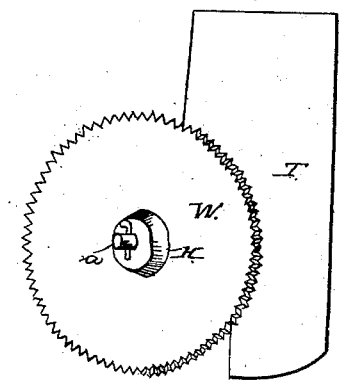
Figure 4:
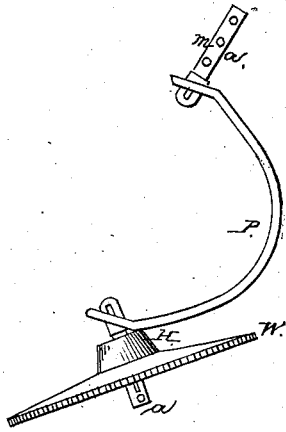
Figure 6:

Figure 1 represents a top view of the dropping-tube, covering, cultivating, and hoeing apparatus. Fig. 2 is a similar view with the axles so placed that the action of the wheels throws the earth outward to the plants in passing between rows. Fig. 3 shows a side view of dropping-tube and wheel. Fig. 4 is the top view of a circular bar with adjustable and reversible axle-arms attached. Fig. 5 is a top view of a reversible axle with reversed cone-shaped bearings. Fig. 6 represents the wheel-hub and cone-bearing.

My invention consists in the construction of a dropping-tube, to which an adjustable or reversible axle or arms are attached; also, a bent bar with stationary and reversible arms, upon which are disks or wheels placed obliquely to the line of draft, having cone-shaped bearings, which equalizes the side draft, and thereby prevents friction on the axle, the cone being secured to the arm by a pin, and may be adjusted by shifting it to vary the width of the disks, the hubs being covered by a cap, which prevents dirt from getting into the bearings.

To enable others skilled in the art to make and use my invention, I will describe it, referring to the drawings and the letters marked thereon.

The dropping-tube T is made of metal, and so constructed as to open a furrow of sufficient depth, into which the seed is deposited through the cavity C.

On the rear part of the tube T are ears R R, projecting back, into which are fitted an axle, D; or there may be arms $a\ a$, they having tenons $b\ b$, with shoulders on an angle, and are secured to the tube T by keys $b'\ b'$, and by turning them half over or changing sides the oblique position of the wheels $w\ w$ are reversed, so as to gather the earth either in to cover the furrow made by the tube T or force the earth out for the purpose of cultivating or hoeing plants or vegetables. The arms $a\ a$ are made of sufficient length to admit of a series of holes, $m\ m$, so that the wheels or disks may be moved out or in to give more or less width between the disks, for the purpose of covering grain deeper or more shallow, as may be desired.

I construct the axle D, as seen in Fig. 5, of a single bar, shaped so as to give the oblique angle to the disks $w\ w$, on the ends of which are the journals $a\ a$, on which are fitted cone-sheaths B B, which form the bearings for the disks to revolve upon, the cone B being of such an angle as to bring the front part of the cone in a line at a right angle to the line of draft of the machine, as seen in cross-line in Fig. 5, while the disks revolve obliquely, and thereby prevent the earth from crowding the disk against the pin $i$, as the large ends of the cones are placed on the outer ends of the arms when throwing the earth toward the center of the machine; and when it is desirable to throw the earth out against the plants in cultivating and hoeing, we then reverse the sides of the wheels and cone, which prevents in a great degree the friction. The cone-bearing B, pin $i$, and cap $d$ are indispensable to the easy action and draft of the machine or implement.

The wheels or disks are secured to and made to revolve in any position apart by having a number of holes through the arms $a\ a$, to which the pins $i\ i$ may be changed, there being a recess, $e$, in the large end of the cone B to receive the pin $i$, the cone and pin being incased and concealed by the cap $d$, which is secured to the hub of the wheel by the bolts and nuts $n\ n$.

Having thus fully described my invention and its operation, what I claim as new, and desire to secure by Letters Patent, is—

1. The two serrated or plain disks $w\ w$, oblique to the line of motion, upon stationary, adjustable, and reversible arms $a\ a$, attached directly to the dropping-tube T, and the stationary and adjustable arms attached to a piece, P P, for the purpose of covering grain and cultivating and hoeing vegetables in different manners, as set forth.

2. The application of the cone-bearings B and cap $d$ and pin $i$ in the hub H and disk W, when placed or running obliquely to the line of motion, when applied to seed-planters and cultivating and hoeing machines, for the purpose of equalizing the side draft, to obviate friction and secure a more easy action of the machine or implement, as specified, for the purposes set forth.

JOSEPH F. POND.

Witnesses:
J. B. WOODRUFF,
DAVID O. HICKEY.